US012766488B2

(12) United States Patent
Konnai et al.

(10) Patent No.: US 12,766,488 B2
(45) Date of Patent: Oct. 20, 2026

(54) COMPOSITE

(71) Applicant: JFE MINERAL COMPANY, LTD., Tokyo (JP)

(72) Inventors: Hidefumi Konnai, Tokyo (JP); Takahiro Takei, Kofu (JP)

(73) Assignee: JFE MINERAL COMPANY, LTD., Tokyo (JP)

( * ) Notice: Subject to any disclaimer, the term of this patent is extended or adjusted under 35 U.S.C. 154(b) by 519 days.

(21) Appl. No.: 17/802,182

(22) PCT Filed: Feb. 26, 2021

(86) PCT No.: PCT/JP2021/007470
§ 371 (c)(1),
(2) Date: Aug. 25, 2022

(87) PCT Pub. No.: WO2021/172545
PCT Pub. Date: Sep. 2, 2021

(65) Prior Publication Data
US 2023/0356189 A1 Nov. 9, 2023

(30) Foreign Application Priority Data
Feb. 28, 2020 (JP) ................................ 2020-033201

(51) Int. Cl.
*B01J 21/10* (2006.01)
*B01J 21/16* (2006.01)
(Continued)

(52) U.S. Cl.
CPC ............... *B01J 21/10* (2013.01); *B01J 21/16* (2013.01); *B01J 23/04* (2013.01); *B01J 23/462* (2013.01);
(Continued)

(58) Field of Classification Search
CPC ... B01J 21/10; B01J 21/16; B01J 35/19; B01J 35/50; B01J 23/04; B01J 23/462;
(Continued)

(56) References Cited

U.S. PATENT DOCUMENTS

| | | | |
|---|---|---|---|
| 4,358,400 | A | 11/1982 | Santilli |
| 2009/0092836 | A1 | 4/2009 | Geckeler et al. |

(Continued)

FOREIGN PATENT DOCUMENTS

| | | | |
|---|---|---|---|
| CN | 107008334 | A | 8/2017 |
| EP | 3632543 | A1 | 4/2020 |

(Continued)

OTHER PUBLICATIONS

S.N. Goncharova, E.A. Paukshtis, B.S. Bal'zhinimaev, "Size effects in ethylene oxidation on silver catalysts. Influence of support and Cs promoter", Applied Catalysis A: General, vol. 126, Issue 1, pp. 67-84, ISSN 0926-860X, https://doi.org/10.1016/0926-860X(95)00036-4. (Year: 1995).*

(Continued)

*Primary Examiner* — Anthony J Zimmer
*Assistant Examiner* — Logan Laclair
(74) *Attorney, Agent, or Firm* — Buchanan Ingersoll & Rooney PC

(57) ABSTRACT

Provided is a composite body that includes halloysite powder including a granule in which halloysite including a halloysite nanotube is aggregated, and a transition metal catalyst carried in the halloysite powder. The granule preferably includes a first pore derived from a tube hole of the halloysite nanotube, and a second pore different from the first pore. The transition metal catalyst preferably includes at least one element selected from the group consisting of iron, ruthenium, cobalt, nickel and silver.

15 Claims, 4 Drawing Sheets

(51) Int. Cl.

| | |
|---|---|
| ***B01J 23/04*** | (2006.01) |
| ***B01J 23/46*** | (2006.01) |
| ***B01J 23/52*** | (2006.01) |
| ***B01J 23/75*** | (2006.01) |
| ***B01J 23/755*** | (2006.01) |
| ***B01J 35/00*** | (2024.01) |
| ***B01J 35/45*** | (2024.01) |
| ***B82Y 35/00*** | (2011.01) |
| ***B82Y 40/00*** | (2011.01) |

(52) U.S. Cl.

CPC ............... *B01J 23/52* (2013.01); *B01J 23/75* (2013.01); *B01J 23/755* (2013.01); *B01J 35/19* (2024.01); *B82Y 35/00* (2013.01); *B82Y 40/00* (2013.01); *B01J 35/45* (2024.01); *B01J 2235/00* (2024.01); *B01J 2235/15* (2024.01); *B01J 2235/30* (2024.01)

(58) Field of Classification Search

CPC . B01J 23/52; B01J 23/75; B01J 23/755; B01J 35/45; B01J 2235/00; B01J 2235/15; B01J 2235/30; B01J 23/002; B01J 23/66; B01J 35/391; B01J 35/69; B01J 37/0045; B01J 37/0205; B01J 23/58; B01J 23/78; B01J 35/615; B01J 35/695; B01J 37/088; B01J 23/46; B82Y 35/00; B82Y 40/00; Y02E 60/36; C01B 3/047; C01B 3/04

USPC .......................................................... 502/340

See application file for complete search history.

(56) References Cited

U.S. PATENT DOCUMENTS

| | | | | |
|---|---|---|---|---|
| 2016/0092661 | A1* | 3/2016 | Hollingshead ....... | A61K 8/4973 510/130 |
| 2018/0323457 | A1 | 11/2018 | Kojima et al. | |
| 2020/0062603 | A1 | 2/2020 | Konnai et al. | |
| 2020/0266469 | A1 | 8/2020 | Kojima et al. | |
| 2021/0016250 | A1 | 1/2021 | Trudell et al. | |
| 2021/0246039 | A1 | 8/2021 | Konnai | |

FOREIGN PATENT DOCUMENTS

| | | | |
|---|---|---|---|
| EP | 4053078 | A1 | 9/2022 |
| GB | 2059283 | A | 4/1981 |
| JP | 5670091 | A | 6/1981 |
| JP | 57140646 | A | 8/1982 |
| JP | 2009091236 | A | 4/2009 |
| JP | 2019171311 | A * | 10/2019 |
| WO | 2017099149 | A1 | 6/2017 |
| WO | 2018079556 | A1 | 5/2018 |
| WO | 2018221701 | A1 | 12/2018 |
| WO | 2019183215 | A2 | 9/2019 |
| WO | 2019208646 | A1 | 10/2019 |

OTHER PUBLICATIONS

Machine Translation of JP 2009233600, Asano et al., Oct. 15, 2009 (Year: 2009).*

Machine Tranlsation of CN106957417, Fan et al., Jul. 18, 2017 (Year: 2017).*

Yang et al. "Effect of magnesium promoter on iron-based catalyst for Fischer-Tropsch synthesis", Journal of Molecular Catalysis A: Chemical 245 (2006) 26-36 (Year: 2006).*

Machine Translation, WO-2018079556, Konnai et al. 2018-05-03 (Year: 2018).*

Machine Translation, WO-2019208646, Konnai Hidefumi, 2019-10-31 (Year: 2019).*

Machine Translation, JP-2019171311, Miyake et al., 2019-10-10 (Year: 2019).*

Wang et al. "Halloysite-Nanotube-Supported Ru Nanoparticles for Ammonia Catalytic Decomposition to Produce COx-Free Hydrogen", Energy Fuels 2011, 25, 8, 3408-3416 (Year: 2011).*

Chinese Office Action with Search Report for Chinese Application No. 202180016336.5, dated Apr. 11, 2023, 10 pages.

Chinese Office Action with English Search Report for Application No. 202180016336.5, dated Oct. 12, 2023, 10 pages.

Yin et al., "Investigation on the Catalysis of COx-free Hydrogen Generation from Ammonia", Journal of Catalysis, (Jun. 2004), vol. 224, No. 2, pp. 384-396.

Office Action (Request for Submission of an Opinion) issued Jul. 19, 2024, by the Korean Intellectual Property Office in corresponding Korean Patent Application No. 10-2022-7028944 and an English translation of the Office Action. (19 pages).

International Search Report and Written Opinion for International Application No. PCT/JP2021/007470, dated Apr. 27, 2021, 7 pages.

Jaine et al., "Synthesis, Characterisation, and Catalytic Properties of Halloysite-Supported Metal Nanoparticles", Mater. Res. Bull., Nov. 20, 2018, vol. 111, pp. 251-258.

Wang, L. et al., "Halloysite-Nanotube-Supported Ru Nanoparticles for Ammonia Catalytic Decomposition to Produce COx-Free Hydrogen", Energy & Fuels, Jul. 21, 2011, pp. 3408-3416, vol. 25(8), XP055857307.

Wang, S.J. et al., "Investigation on Modification of Ru/CNTs catalyst for the Generation of COx-Free Hydrogen from Ammonia", Applied Catalysis B: Environmental, Jun. 7, 2004, pp. 287-299, vol. 52(4), XP093062619.

Lucentini, I. et al., "Catalytic Ammonia Decomposition for Hydrogen Production on Ni, Ru and Ni—Ru Supported on $CeO_2$", International Journal of Hydrogen Energy, Feb. 8, 2019, pp. 12693-12707, vol. 44(25), XP093062618.

Extended European Search Report for European Application No. 21 761 448.6, dated Jul. 19, 2023, 10 pages.

Office Action (Notice of Final Rejection) issued Mar. 17, 2025, by the Korean Intellectual Property Office in corresponding Korean Patent Application No. 10-2022-7028944 and an English translation with Concise Statement of Relevance of Office Action. (14 pages).

* cited by examiner

COMPOSITE

CROSS REFERENCE TO RELATED APPLICATIONS

This is the U.S. National Phase application of PCT/JP2021/007470, filed Feb. 26, 2021 which claims priority to Japanese Patent Application No. 2020-033201, filed Feb. 28, 2020, the disclosures of these applications being incorporated herein by reference in their entireties for all purposes.

FIELD OF THE INVENTION

The present invention relates to a composite body.

BACKGROUND OF THE INVENTION

Patent Literature 1 discloses technology using, as a catalyst in an ammonia decomposition reaction, a composite body comprising a carrier such as magnesia, and a transition metal catalyst containing ruthenium or the like carried in the carrier.

PATENT LITERATURE

Patent Literature 1: WO 2017/099149

SUMMARY OF THE INVENTION

Conventional composite bodies had insufficient catalytic activity in a reaction such as an ammonia decomposition reaction in some cases.

Hence, aspects of the present invention have an object to provide a composite body having excellent catalytic activity in a reaction such as an ammonia decomposition reaction.

The present inventors have made an intensive study to achieve the above-described object and found that a composite body using a specific carrier exhibits excellent catalytic activity. Aspects of the present invention have been thus completed.

Specifically, aspects of the present invention include the following [1] to [7].

[1] A composite body comprising halloysite powder including a granule in which halloysite including a halloysite nanotube is aggregated, and a transition metal catalyst carried in the halloysite powder.

[2] The composite body according to [1], wherein the granule includes a first pore derived from a tube hole of the halloysite nanotube, and a second pore different from the first pore.

[3] The composite body according to [1] or [2], wherein the transition metal catalyst includes at least one element selected from the group consisting of iron, ruthenium, cobalt, nickel and silver.

[4] The composite body according to any one of [1] to [3], wherein a content of a transition metal element in the transition metal catalyst is not less than 0.5 mol % in terms of oxide based on a total amount of the composite body.

[5] The composite body according to any one of [1] to [4], further comprising at least one promoter that is selected from the group consisting of an alkali metal catalyst and an alkaline-earth metal catalyst and that is carried in the halloysite powder.

[6] The composite body according to [5], wherein the promoter includes at least one element selected from the group consisting of sodium, magnesium, and potassium.

[7] The composite body according to [5] or [6], wherein a content of at least one element included in the promoter and selected from the group consisting of an alkali metal element and an alkaline-earth metal element is not less than 0.1 mol % in terms of oxide based on a total amount of the composite body.

Aspects of the present invention can provide a composite body having excellent catalytic activity in a reaction such as an ammonia decomposition reaction.

DETAILED DESCRIPTION OF EMBODIMENTS OF THE INVENTION

Figure 1:
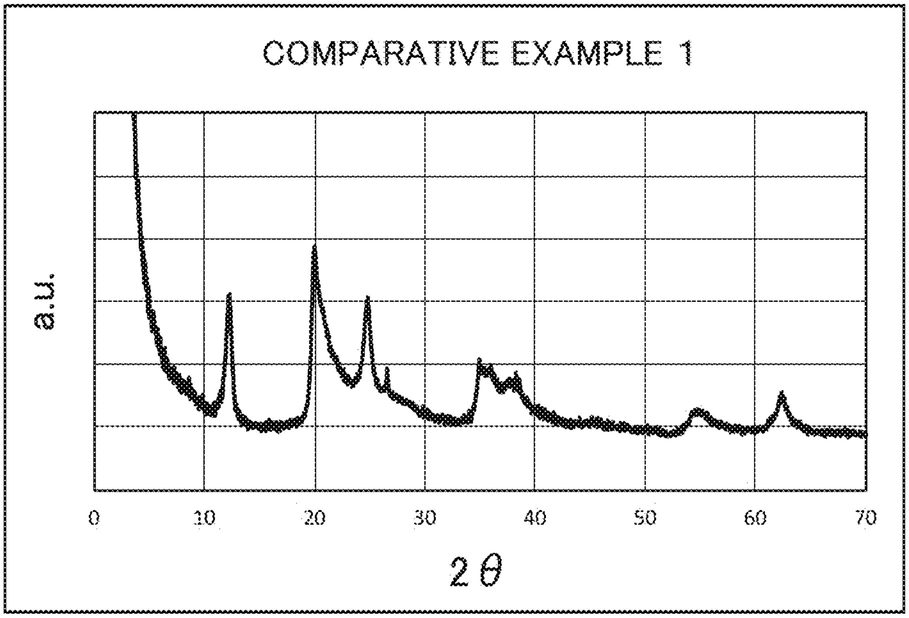
FIG. 1 shows the XRD pattern of a composite body (halloysite powder 1) of Comparative Example 1.

Hereinafter, the numerical ranges indicated using "(from) . . . to . . . " include the former number as the lower limit value and the latter number as the upper limit value.

[Composite Body]

The composite body according to aspects of the invention is a composite body comprising halloysite powder including a granule in which halloysite including a halloysite nanotube is aggregated, and a transition metal catalyst carried in the halloysite powder.

The halloysite powder (hereinafter, also referred to as "halloysite powder according to aspects of the invention" for convenience) in the composite body according to aspects of the invention functions as a so-called catalyst carrier.

In the halloysite powder according to aspects of the invention, as described later, the granule preferably includes a first pore derived from a tube hole of the halloysite nanotube, and a second pore different from the first pore. The second pore is assumed as being derived from a gap between halloysite aggregates.

Presumably, since the transition metal catalyst is carried on the surface of the above-described halloysite powder according to aspects of the invention (in particular, on the surface of the first pore and/or the surface of the second pore), the inside of the first pore or the second pore is utilized as a reaction field, resulting in excellent catalytic activity (specifically, catalytic activity in an ammonia decomposition reaction).

It is also presumed that the halloysite powder according to aspects of the invention functions not only as the catalyst carrier but also as a solid acid catalyst having a specific nano space, effectively assisting the catalytic activity.

<Transition Metal Catalyst>

The transition metal catalyst contains a transition metal element.

While depending on the catalytic reaction to which the composite body according to aspects of the invention is adopted, suitable examples of the transition metal element include: Group 8 elements such as iron (Fe) and ruthenium (Ru); Group 9 elements such as cobalt (Co), rhodium (Rh), and iridium (Ir); Group 10 elements such as nickel (Ni); and Group 11 elements such as copper (Cu), silver (Ag), and gold (Au), because the catalytic activity in an ammonia decomposition reaction is excellent.

Among these, at least one element selected from the group consisting of iron (Fe), ruthenium (Ru), cobalt (Co), nickel (Ni), and silver (Ag) is more preferable, because the catalytic activity in an ammonia decomposition reaction is more excellent.

Because the catalytic activity is more excellent, in the composite body according to aspects of the invention, a content of the transition metal element in the transition metal catalyst in terms of oxide is preferably not less than 0.5 mol %, more preferably not less than 1.5 mol %, and further preferably not less than 2.5 mol %, based on a total amount of the composite body according to aspects of the invention.

Meanwhile, the upper limit thereof is not particularly limited and is, for example, preferably not more than 10.0 mol %, more preferably not more than 8.0 mol %, and further preferably not more than 5.0 mol %.

Here, a content of the transition metal element "in terms of oxide" specifically means a content "in terms of $Fe_2O_3$" when the transition metal element is "Fe," a content "in terms of $RuO_2$" when the transition metal element is "Ru," a content "in terms of $Co_2O_3$" when the transition metal element is "Co," a content "in terms of NiO" when the transition metal element is "Ni", and a content "in terms of $Ag_2O$" when the transition metal element is "Ag."

A content of the transition metal element (in terms of oxide) is determined through X-ray fluorescence (XRF) analysis. A content of the transition metal element (in terms of oxide) is a 100%-normalized value excluding an ignition loss. The specific conditions in the XRF analysis are as follows.

Instrument: ZSX Primus II (available from Rigaku Corporation)

Pretreatment method: powder measurement method using an exclusive powder container and a polypropylene membrane Quantification method: quantitative analysis through FP method-SQX analysis and calibration curve method using certified standard substance (gairome clay, kaoline, pottery stone) of The Ceramic Society of Japan The form of the transition metal catalyst carried in the halloysite powder according to aspects of the invention is not particularly limited.

For instance, the transition metal catalyst may be carried in the halloysite powder according to aspects of the invention in the form of metal (metal simple substance) or may be carried in the halloysite powder according to aspects of the invention in the form of a compound such as an oxide or a chloride.

<Promoter>

It is preferable that the composite body according to aspects of the invention further includes a promoter (at least one catalyst selected from the group consisting of an alkali metal catalyst and an alkaline-earth metal catalyst) carried in the halloysite powder according to aspects of the invention. With this constitution, the catalytic activity in, for example, an ammonia decomposition reaction is more excellent.

The alkali metal catalyst includes an alkali metal element such as lithium (Li), sodium (Na), potassium (K), rubidium (Rb), or cesium (Cs).

The alkaline-earth metal catalyst includes an alkaline-earth metal element such as magnesium (Mg), calcium (Ca), strontium (Sr), or barium (Ba).

In other words, the promoter contains at least one element (also referred to as "promoter element" for convenience) selected from the group consisting of alkali metal elements and alkaline-earth metal elements.

The promoter preferably contains at least one element selected from the group consisting of sodium (Na), magnesium (Mg), and potassium (K) as the promoter element, because the catalytic activity in an ammonia decomposition reaction is further excellent.

In the composite body according to aspects of the invention, a content of the promoter element included in the promoter in terms of oxide is preferably not less than 0.1 mol %, more preferably not less than 0.2 mol %, and further preferably not less than 0.3 mol %, based on a total amount of the composite body according to aspects of the invention.

Meanwhile, the upper limit thereof is not particularly limited and is, for example, preferably not more than 2.0 mol %, more preferably not more than 1.5 mol %, and further preferably not more than 1.0 mol %.

Here, a content of the promoter element "in terms of oxide" specifically means a content "in terms of $Na_2O$" when the promoter element is "Na," a content "in terms of MgO" when the promoter element is "Mg," and a content "in terms of $K_2O$" when the promoter element is "K."

A content of the promoter element (in terms of oxide) is determined through the XRF analysis as with a content of the transition metal element (in terms of oxide) described above.

The form of the promoter carried in the halloysite powder according to aspects of the invention is not particularly limited.

For instance, the promoter may be carried in the halloysite powder according to aspects of the invention in the form of metal (metal simple substance) or may be carried in the halloysite powder according to aspects of the invention in the form of a compound such as an oxide or a chloride.

<Halloysite Powder>

Next, the halloysite powder according to aspects of the invention is described.

The halloysite powder according to aspects of the invention is powder including a granule in which halloysite including a halloysite nanotube is aggregated.

In the present specification, an aggregate of a plurality of "granules" is referred to as "powder."

In the halloysite powder according to aspects of the present invention, the granule preferably includes a first pore derived from a tube hole of the halloysite nanotube, and a second pore different from the first pore.

Halloysite is a clay mineral represented by $Al_2Si_2O_5(OH)_4 \cdot 2H_2O$, or $Al_2Si_2O_5(OH)_4$.

Halloysite assumes various shapes such as a tubular shape (hollow tubular shape), a spherical shape, an angular lump shape, a plate-like shape, and a sheet-like shape.

The inner diameter of a halloysite nanotube (the diameter of a tube hole), which halloysite nanotube is a tube-shaped (hollow tube-shaped) halloysite, is approximately from 10 to 20 nm, for example. The outer surface of the halloysite nanotube is mainly composed of silicate ($SiO_2$), and the inner surface of the halloysite nanotube is mainly composed of alumina ($Al_2O_3$).

In the specification, "halloysite" includes "metahalloysite."

"Metahalloysite" is dehydrated halloysite, i.e., halloysite represented by $Al_2Si_2O_5(OH)_4$ from which OH is removed to assume a low-crystalline form, and is a term that has been conventionally, generally or idiomatically used to refer to a variant of halloysite.

In the specification, "metahalloysite" is defined as "a product obtained by firing halloysite at a specific firing temperature." The "specific firing temperature" is, for example, not lower than 500° C., and preferably not lower than 600° C.

The upper limit of the "specific firing temperature" is not particularly limited and is, for example, not higher than 1,000° C. Within the foregoing temperature range, the shape of halloysite nanotube (tubular shape) does not change.

A suitable example of the halloysite powder according to aspects of the invention is halloysite powder described in paragraphs [0031] to [0057] in WO2018/079556. The differential pore distribution determined from a nitrogen adsorption isotherm by the BJH method preferably exhibits two or more pore size peaks in a range of not less than 10 nm.

A method of producing the halloysite powder according to aspects of the invention (hereinafter, also referred to as "halloysite powder production method according to aspects of the invention") is described.

The halloysite powder production method according to aspects of the invention is, for example, a method including a step of preparing a slurry of halloysite including halloysite nanotubes (slurry preparation step), and a step of preparing powder from the slurry (powder preparation step). The method may further include a step (firing step) of firing the powder obtained in the powder preparation step.

Examples of the powder preparation step include a step of spray-drying the slurry prepared in the slurry preparation step to obtain powder. The method of preparing powder from the slurry is not limited to the spray-drying described above, and, for example, media fluidized drying (drying using a fluidized bed including balls) may be employed.

The foregoing halloysite powder production method according to aspects of the invention is suitably exemplified by a method described in paragraphs [0011] to [0030] in WO2018/079556.

[Method of Producing Composite Body]

Next, a method of producing the composite body according to aspects of the invention (hereinafter, also referred to as "composite body production method according to aspects of the invention") is described.

<Step A>

First, the composite body production method according to aspects of the invention optionally includes a step (Step A) of causing the halloysite powder according to aspects of the invention to carry the promoter.

In other words, when the composite body according to aspects of the invention includes the promoter, Step A is carried out.

In Step A, a salt of the promoter element (at least one element selected from the group consisting of alkali metal elements and alkaline-earth metal elements) included in the promoter is dissolved in water such as distilled water, whereby an aqueous solution A is obtained. The aqueous solution A contains ions of the promoter element.

Examples of the salt of the promoter element include, for example, a chloride, a carbonate, a nitrate, and a sulfate of the promoter element, and among these, a sulfate is preferred. The salt may be a hydrate.

Next, the halloysite powder according to aspects of the invention is added to the aqueous solution A. As a result, obtained is a dispersion A in which the halloysite powder according to aspects of the invention is dispersed in the aqueous solution A. In this process, an amount of the aqueous solution A is preferably 10 to 1,000 mL with respect to 1 g of the halloysite powder according to aspects of the invention.

In the dispersion A, an amount-of-substance ratio between an amount of substance of Al in halloysite ($Al_2Si_2O_5(OH)_4$) and an electric charge of the promoter element (amount of substance of Al in halloysite/electric charge of promoter element) is preferably 1/1 to 1/5.

Hypothetically, a case where the amount-of-substance ratio is 1/3 (2/6) is discussed. In this case, when the promoter element is, for example, sodium (Na), the promoter element, i.e., Na, has an amount of substance of 6 moles (with sodium being Na+, hence 6 moles) with respect to 2 moles of Al (in halloysite).

Next, the dispersion A is subjected to shaking using a commercial shaking apparatus or the like.

The shaking temperature is preferably not lower than 20° C., and more preferably not lower than 30° C. Meanwhile, the shaking temperature is preferably not higher than 60° C., and more preferably not higher than 50° C.

The shaking time is preferably not less than 12 hours, and more preferably not less than 18 hours. Meanwhile, the shaking time is preferably not more than 36 hours, and more preferably not more than 30 hours.

The shaking speed is preferably not lower than 50 rpm, and more preferably not lower than 100 rpm. Meanwhile, the shaking speed is preferably not higher than 400 rpm, and more preferably not higher than 300 rpm.

Next, the dispersion A having been shaken is filtrated, and a solid A is collected. The filtration method and the collection method are not particularly limited, and any conventionally known methods may be used.

The collected solid A is dried.

The drying conditions are not particularly limited as long as moisture in the solid A is sufficiently removed, and, for example, the drying temperature is preferably not lower than 30° C., and more preferably not lower than 40° C. Meanwhile, the temperature is preferably not higher than 70° C., and more preferably not higher than 60° C.

The drying time is preferably not less than 6 hours, and more preferably not less than 10 hours. Meanwhile, the drying time is preferably not more than 24 hours, and more preferably not more than 20 hours.

By drying the solid A in this manner, a sample A is obtained. In the sample A, the promoter is carried in the halloysite powder according to aspects of the invention.

As described above, in the sample A, the promoter may be carried in the halloysite powder according to aspects of the invention in the form of metal (metal simple substance) or may be carried in the halloysite powder according to aspects of the invention in the form of a compound such as an oxide or a chloride.

<Step B>

The composite body production method according to aspects of the invention includes a step (Step B) of causing a carrier S to carry the transition metal catalyst. The carrier S is the halloysite powder according to aspects of the invention and/or the sample A obtained in Step A.

In Step B, a salt of the transition metal element included in the transition metal catalyst is dissolved in water such as distilled water, whereby an aqueous solution B is obtained. The aqueous solution B contains ions of the transition metal element.

Examples of the salt of the transition metal element include, for example, a chloride, a carbonate, a nitrate, and a sulfate of the transition metal element, and among these, a chloride is preferred. The salt may be a hydrate.

Next, the carrier S is added to the aqueous solution B. As a result, obtained is a dispersion B in which the carrier S is dispersed in the aqueous solution B. In this process, an amount of the aqueous solution B is preferably 10 to 1,000 mL with respect to 1 g of the carrier S.

In the dispersion B, an amount-of-substance ratio between an amount of substance of Al in halloysite ($Al_2Si_2O_5(OH)_4$) and an electric charge of the transition metal element (amount of substance of Al in halloysite/electric charge of transition metal element) is preferably 1/1 to 1/5.

Hypothetically, a case where the amount-of-substance ratio is 1/3 (2/6) is discussed. In this case, when the transition metal element is, for example, nickel (Ni), the transition metal element, i.e., Ni, has an amount of substance of 3 moles (with nickel being $Ni^2$+, hence 3 moles) with respect to 2 moles of Al (in halloysite).

Next, the dispersion B is subjected to shaking using a commercial shaking apparatus or the like.

The conditions (including shaking temperature, shaking time, and shaking speed) for shaking the dispersion B have the same preferable ranges as those for shaking the dispersion A described above.

Next, the dispersion B having been shaken is filtrated, and a solid B is collected. The filtration method and the collection method are not particularly limited, and any conventionally known methods may be used.

The collected solid B is dried.

The conditions (including drying temperature, and drying time) for drying the solid B have the same preferable ranges as those for drying the solid A described above.

By drying the solid B in this manner, a sample B is obtained. In the sample B, the transition metal catalyst is carried in the halloysite powder according to aspects of the invention.

As described above, in the sample B, the transition metal catalyst may be carried in the halloysite powder according to aspects of the invention in the form of metal (metal simple substance) or may be carried in the halloysite powder according to aspects of the invention in the form of a compound such as an oxide or a chloride.

When the sample A is used as the carrier S in Step B, the promoter is also carried in the halloysite powder according to aspects of the invention in the sample B thus obtained.

EXAMPLES

Aspects of the invention are specifically described below with reference to Examples. However, the present invention is not limited thereto.

<Preparation of Halloysite Powder>

Halloysite powder 1 (corresponding to the "halloysite powder" described above) to be used in each of Examples was produced. Specifically, in accordance with Example 7 described in [EXAMPLES] (paragraphs [0059] to [0087]) of WO2018/079556, a slurry containing halloysite nanotubes was spray-dried, whereby powder was obtained.

Meanwhile, the powder having been spray-dried was fired at firing temperature of 450° C. Specifically, the powder having been spray-dried was heated by an electric furnace utilizing Siliconit heating elements, in which the temperature was increased from room temperature at a temperature increase rate of 5° C./min. and maintained at 450° C. for 1 hour, and thereafter the powder was cooled in the furnace. When the temperature was increased and maintained at the firing temperature, in order to promote burning off of the surfactant, ventilation was performed while a certain amount of air was supplied into the furnace.

Hereinbelow, the halloysite powder 1 may be described as "Hs1" for convenience.

<Preparation of composite body>

In accordance with the procedure described below, the composite bodies of Examples 1 to 10 and Comparative Examples 1 to 2 were prepared.

Example 1: Na—Ni

As a salt of the promoter element, sodium nitrate ($NaNO_3$, guaranteed reagent, available from Kanto Chemical Co., Inc.) was dissolved in distilled water, whereby the aqueous solution A was obtained.

The halloysite powder 1 was added to the thus obtained aqueous solution A, whereby the dispersion A was obtained. In this process, an amount of the aqueous solution A was 500 mL with respect to 1 g of the halloysite powder 1. In the dispersion A, the amount-of-substance ratio between an amount of substance of Al in halloysite and an electric charge of the promoter element (Na in this case) (amount of substance of Al in halloysite/electric charge of promoter element) was 1/3.

The obtained dispersion A was subjected to shaking using a shaking apparatus (BR-23FH, available from TAITEC Corporation) under the conditions of 40° C., 24 hours, and 200 rpm, and thereafter filtrated, whereby the solid A was obtained. The solid A thus obtained was dried at 50° C. for 12 hours, whereby the sample A was obtained.

Next, as a salt of the transition metal element, nickel (II) chloride hexahydrate ($NiCl_2 \cdot 6H_2O$, guaranteed reagent, available from Nakalai Tesque Inc.) was dissolved in distilled water, whereby the aqueous solution B was obtained.

The sample A was added to the thus obtained aqueous solution B, whereby the dispersion B was obtained. In this process, an amount of the aqueous solution B was 500 mL with respect to 1 g of the sample A. In the dispersion B, the amount-of-substance ratio between an amount of substance of Al in halloysite and an electric charge of the transition metal element (Ni in this case) (amount of substance of Al in halloysite/electric charge of transition metal element) was 1/3.

The obtained dispersion B was subjected to shaking using a shaking apparatus (BR-23FH, available from TAITEC Corporation) under the conditions of 40° C., 24 hours, and 200 rpm, and thereafter filtrated, whereby the solid B was obtained. The solid B thus obtained was dried at 50° C. for 12 hours, whereby the sample B was obtained.

The obtained sample B was treated as the composite body of Example 1.

Example 2: Mg—Ni

As a salt of the promoter element, in place of sodium nitrate, magnesium nitrate hexahydrate ($Mg(NO_3)_2 \cdot 6H_2P$, guaranteed reagent, available from Kanto Chemical Co., Inc.) was used. Except for the above difference, the composite body of Example 2 was obtained in the same manner as in Example 1.

Example 3: K—Ni

As a salt of the promoter element, in place of sodium nitrate, potassium nitrate ($KNO_3$, guaranteed reagent, available from Kanto Chemical Co., Inc.) was used. Except for the above difference, the composite body of Example 3 was obtained in the same manner as in Example 1.

Example 4: Na—Ru

As a salt of the transition metal element, in place of nickel (II) chloride hexahydrate, ruthenium (III) chloride trihydrate ($RuCl_3 \cdot 3H_2O$, available from Kanto Chemical Co., Inc.) was used. Except for the above difference, the composite body of Example 4 was obtained in the same manner as in Example 1.

Example 5: Mg—Ru

As a salt of the promoter element, in place of sodium nitrate, magnesium nitrate hexahydrate ($Mg(NO_3)_2 \cdot 6H_2O$, guaranteed reagent, available from Kanto Chemical Co., Inc.) was used.

In addition, as a salt of the transition metal element, in place of nickel (II) chloride hexahydrate, ruthenium (III) chloride trihydrate ($RuCl_3 \cdot 3H_2O$, available from Kanto Chemical Co., Inc.) was used.

Except for the above difference, the composite body of Example 5 was obtained in the same manner as in Example 1.

Example 6: K—Ru

As a salt of the promoter element, in place of sodium nitrate, potassium nitrate ($KNO_3$, guaranteed reagent, available from Kanto Chemical Co., Inc.) was used.

In addition, as a salt of the transition metal element, in place of nickel (II) chloride hexahydrate, ruthenium (III) chloride trihydrate ($RuCl_3 \cdot 3H_2O$, available from Kanto Chemical Co., Inc.) was used.

Except for the above difference, the composite body of Example 6 was obtained in the same manner as in Example 1.

Example 7: Na—Fe

As a salt of the transition metal element, in place of nickel (II) chloride hexahydrate, iron (III) chloride hexahydrate ($FeCl_3 \cdot 6H_2O$, available from Kanto Chemical Co., Inc.) was used. Except for the above difference, the composite body of Example 7 was obtained in the same manner as in Example 1.

Example 8: Na—Co

As a salt of the transition metal element, in place of nickel (II) chloride hexahydrate, cobalt (II) chloride hexahydrate ($CoCl_2 \cdot 6H_2O$, available from Kanto Chemical Co., Inc.) was used. Except for the above difference, the composite body of Example 8 was obtained in the same manner as in Example 1.

Example 9: Na—Ag

As a salt of the transition metal element, in place of nickel (II) chloride hexahydrate, silver nitrate ($AgNO_3$, available from Kanto Chemical Co., Inc.) was used. Except for the above difference, the composite body of Example 9 was obtained in the same manner as in Example 1.

Example 10: Ru

The composite body of Example 10 was obtained in the same manner as in Examples 4 to 6 except that the promoter (Na, Mg or K) was not used but the transition metal catalyst (Ru) was only used.

Specifically, first, as a salt of the transition metal element, ruthenium (III) chloride trihydrate ($RuCl_3 \cdot 3H_2O$, available from Kanto Chemical Co., Inc.) was dissolved in distilled water, whereby the aqueous solution B was obtained.

The halloysite powder 1 was added to the thus obtained aqueous solution B, whereby the dispersion B was obtained. In this process, an amount of the aqueous solution B was 500 mL with respect to 1 g of the halloysite powder 1. In the dispersion B, the amount-of-substance ratio between an amount of substance of Al in halloysite and an electric charge of the transition metal element (ruthenium in this case) (amount of substance of Al in halloysite/electric charge of transition metal element) was 1/3.

The obtained dispersion B was subjected to shaking using a shaking apparatus (BR-23FH, available from TAITEC Corporation) under the conditions of 40° C., 24 hours, and 200 rpm, and thereafter filtrated, whereby the solid B was obtained. The solid B thus obtained was dried at 50° C. for 12 hours, whereby the sample B was obtained.

The obtained sample B was treated as the composite body of Example 10.

Comparative Example 1

In Comparative Example 1, the halloysite powder 1 was used without carrying the transition metal catalyst and/or the promoter. This may be called as "composite body of Comparative Example 1" in some cases (although this is not actually a composite body).

Comparative Example 2

The composite body of Comparative Example 2 was obtained in the same manner as in Example 4 except that, in place of the halloysite powder 1, alumina (AKP-G07, available from SUMITOMO CHEMICAL COMPANY, LIMITED, BET surface area: 73.4 $m_2/g$) (sometimes referred to as "carrier X1" or simply as "X1" for convenience) was used.

<Content of Transition Metal Element and promoter element>

In the composite body of each of Examples 1 to 10, contents (unit: mol %) of the transition metal element (for example, nickel in Example 1) and the promoter element (for example, sodium in Example 1) in terms of oxide based on a total amount of the composite body were determined through the XRF under the above-described conditions. The results are shown in Table 1 below.

TABLE 1

| | Example | | | | | | | | | |
|---|---|---|---|---|---|---|---|---|---|---|
| | 1 Na—Ni | 2 Mg—Ni | 3 K—Ni | 4 Na—Ru | 5 Mg—Ru | 6 K—Ru | 7 Na—Fe | 8 Na—Co | 9 Na—Ag | 10 Ru |
| $Na_2O$ | 0.69 | | | 0.30 | | | 1.91 | 0.50 | 0.66 | |
| MgO | | 0.56 | | | 0.10 | | | | | |
| $K_2O$ | | | 0.32 | | | 0.11 | | | | |
| NiO | 4.07 | 1.72 | 3.09 | | | | | | | |
| $RuO_2$ | | | | 4.29 | 3.75 | 2.72 | | | | 4.54 |
| $Fe_2O_3$ | | | | | | | 7.63 | | | |
| $Co_2O_3$ | | | | | | | | 1.50 | | |
| $Ag_2O$ | | | | | | | | | 0.52 | |

(Unit: mol %)

<<Other Physical Properties>>

<<XRD>>

The composite body of each example was subjected to the X-ray diffraction (XRD) measurement. XRD patterns of the composite bodies of Comparative Example 1 and Example 4 are exemplified in FIG. 1 and FIG. 2, respectively.

FIG. 1 is an XRD pattern of the composite body (halloysite powder 1) of Comparative Example 1.

Figure 2:
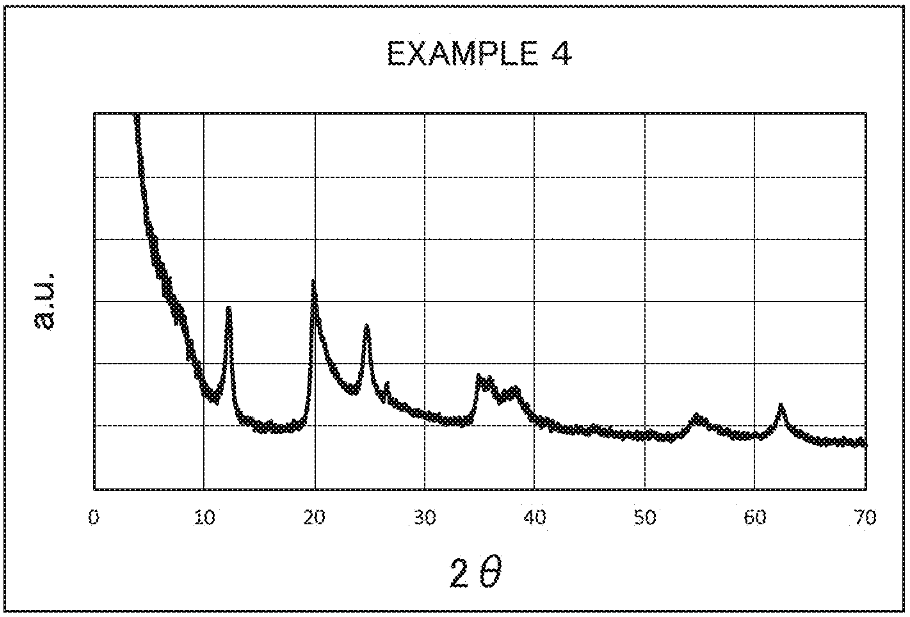
FIG. 2 shows the XRD pattern of a composite body of Example 4.

FIG. 2 is an XRD pattern of the composite body of Example 4.

As shown in FIGS. 1 and 2, regardless of whether the transition metal catalyst and the promoter are carried or not, there was no significant difference between the XRD patters. In either of the cases, the XRD pattern derived from halloysite represented by $Al_2Si_2O_5(OH)_4$ was observed. The same applied to the remaining examples.

<<SEM>>

Of the composite body of each example, a scanning electron microscope (SEM) image was taken. SEM images of the composite bodies of Comparative Example 1 and Example 4 are exemplified in FIG. 3 and FIG. 4, respectively.

Figure 3:
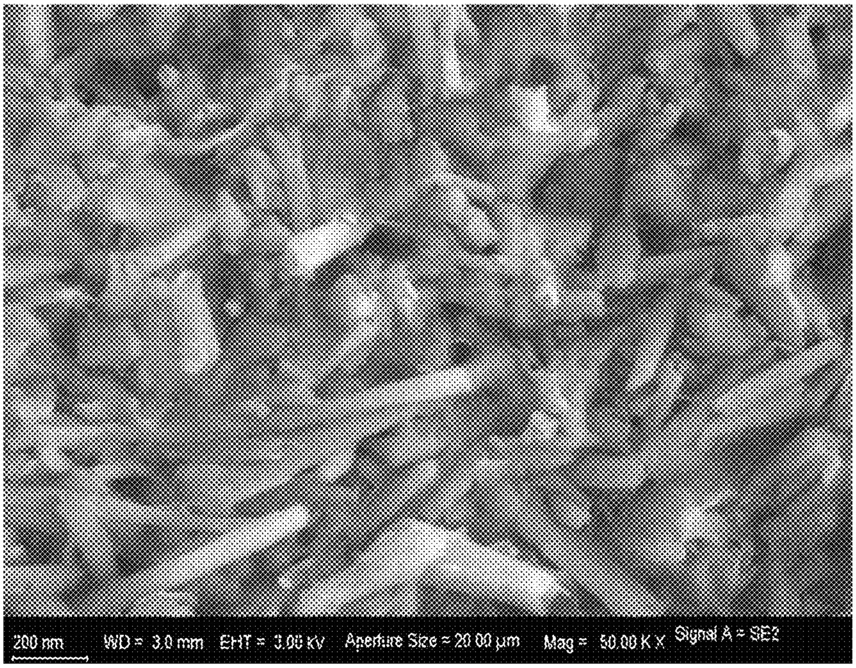
FIG. 3 is an SEM image showing a granule of the composite body (halloysite powder 1) of Comparative Example 1.

FIG. 3 is an SEM image showing a granule of the composite body (halloysite powder 1) of Comparative Example 1.

Figure 4:
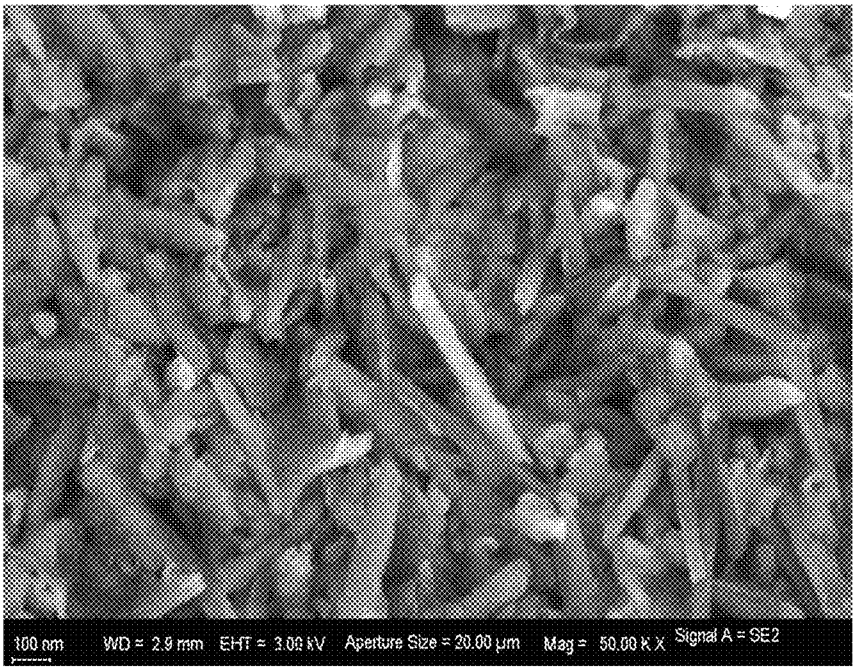
FIG. 4 is an SEM image showing a granule of the composite body of Example 4.

FIG. 4 is an SEM image showing a granule of the composite body of Example 4.

From the SEM images in FIGS. 3 and 4, it was confirmed that pores (first pores) derived from tube holes of halloysite nanotubes were present on a surface of the granule in which halloysite including halloysite nanotubes is aggregated. It was also confirmed that pores (second pores) with a larger size than that of the tube holes were present in a cross-section (not shown) of the granule. The same applied to the remaining examples.

<<TEM>>

Of the composite body of each example, a transmission electron microscope (TEM) image was taken. A TEM image of the composite body of Example 4 is exemplified in FIG. 5.

Figure 5:
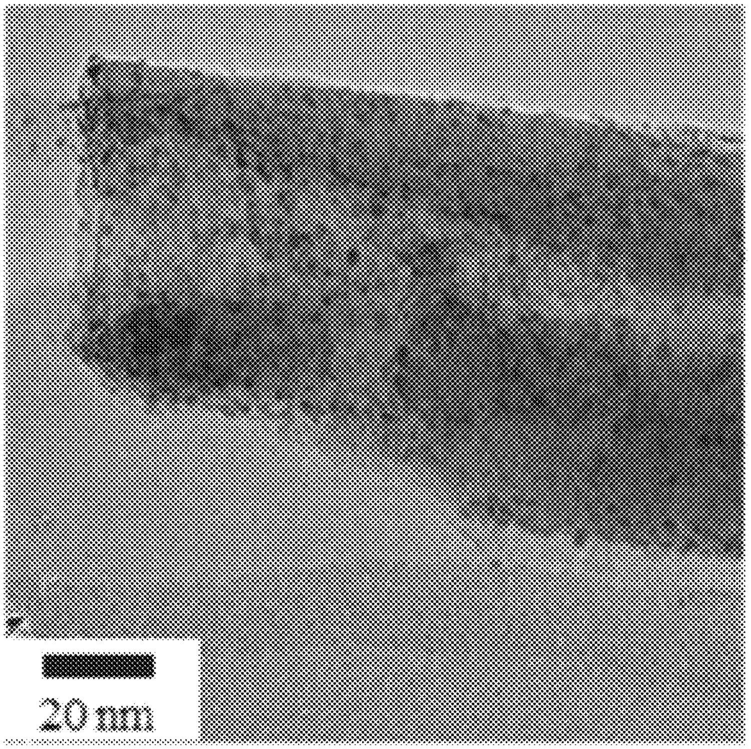
FIG. 5 is a TEM image showing part of the composite body of Example 4.

FIG. 5 is a TEM image showing part of the composite body of Example 4.

From the TEM image in FIG. 5, it was confirmed that particulate ruthenium was carried on the inner and outer surfaces of the halloysite nanotube. Here, it is presumed that since elemental sodium is light, sodium did not appear in the TEM image.

<<Pore Distribution and Average Particle Size>>

The composite body of each example was subjected to the nitrogen adsorption-desorption isotherm measurement. The conditions described in paragraph [0048] in WO2018/079556 were adopted as the measurement conditions. A pore distribution of the composite body of Example 4 is exemplified in FIG. 6.

Figure 6:
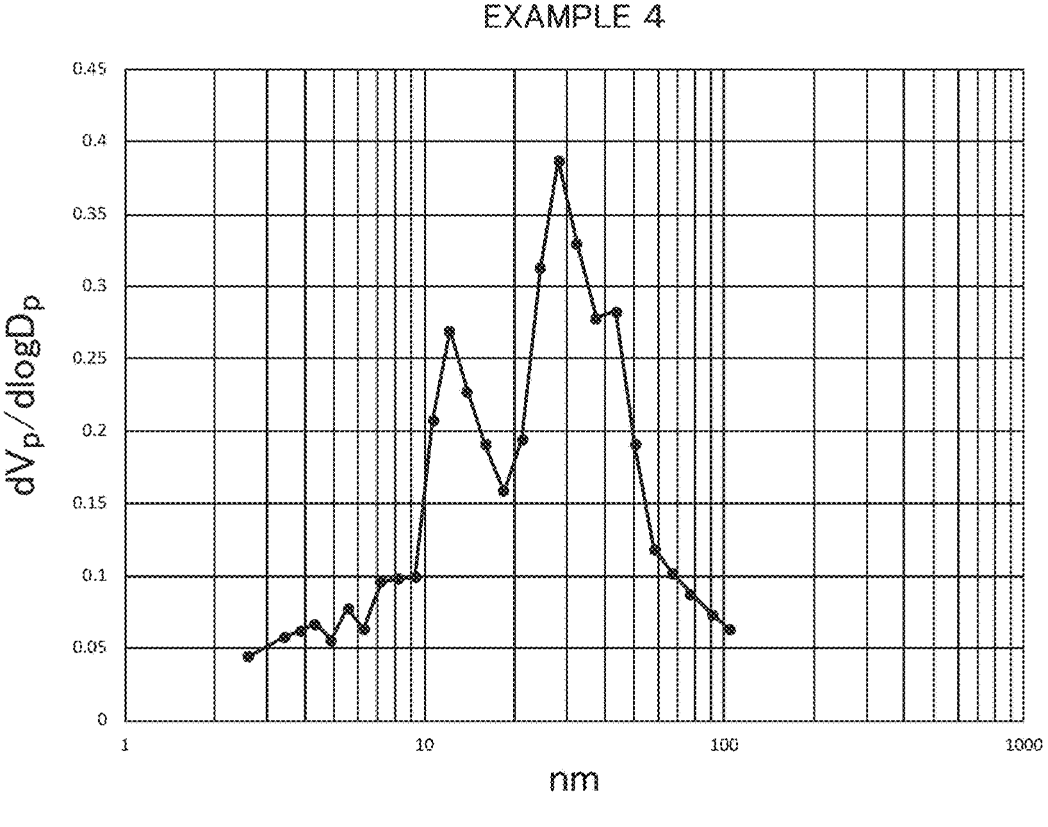
FIG. 6 is a graph showing the differential pore distribution of the composite body of Example 4 determined from the nitrogen adsorption isotherm by the BJH method.

FIG. 6 is a graph showing the differential pore distribution of the composite body of Example 4 determined from the nitrogen adsorption isotherms by the BJH method. The horizontal axis represents pore size [nm], and the vertical axis represents differential pore volume (dVp/dlogDp) [$cm_3$/g]. From the graph in FIG. 6, it was confirmed that two or more pore size peaks were observed in the range of not less than 10 nm.

Along with the pore distribution measurement, the BET specific surface area of the composite body of each example was determined. In addition, the average particle size thereof was measured in accordance with the conditions described in paragraph [0049] in WO2018/079556. The results of Example 4 and Comparative Example 1 are exemplified in Table 2.

TABLE 2

| | Example 4 | Comparative Example 1 |
|---|---|---|
| BET specific surface area [$m^2$/g] | 132 | 70 |
| Average particle size [μm] | 21.1 | 28.3 |

<Evaluation of Catalytic Activity>

Each of the composite bodies of Examples 1 to 10 and Comparative Examples 1 to 2 was used as a sample and evaluated for catalytic activity in ammonia decomposition reaction. For the evaluation, a reaction apparatus shown in FIG. 7 was first assembled.

Figure 7:
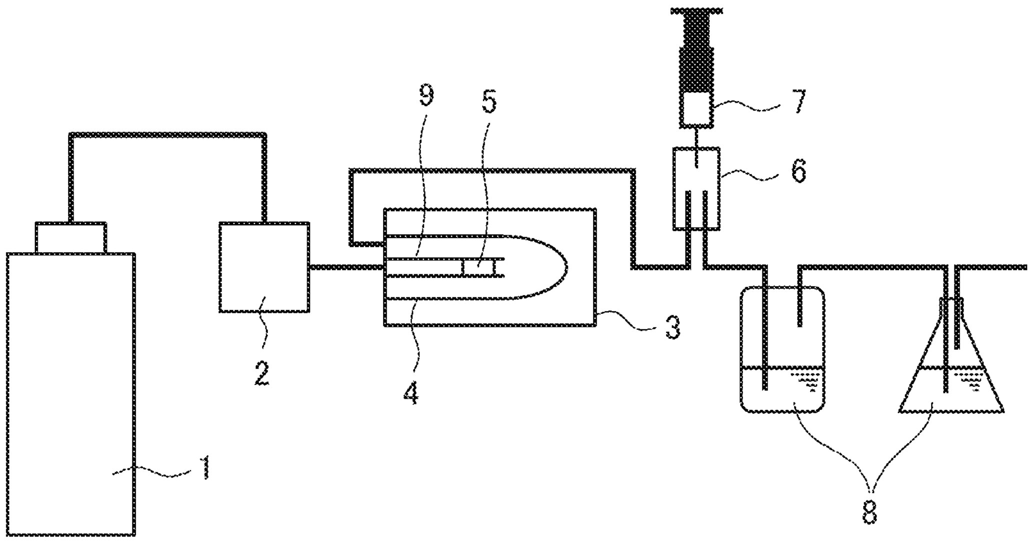
FIG. 7 is a schematic view showing a reaction apparatus.

FIG. 7 is a schematic view showing a reaction apparatus. A Tammann tube 4 made of quartz glass was disposed in an electric furnace 3, and a quartz glass tube 9 with an inner diameter of 8 mm was disposed in the Tammann tube 4. In the quartz glass tube 9, 0.03 g of a sample 5 and silica wool (not shown) for fixing the sample 5 were filled, and ammonia gas ($Ar+NH_3$, $NH_3$: 5.17 vol %, available from TAIYO NIPPON SANSO CORPORATION) was flown from a gas cylinder 1. The gas flow rate was set to 10 mL/min. using a gas flow controller 2. As the electric furnace 3 and the gas flow controller 2, "FT-01 VAC-30" available from FULL-TECH CORPORATION and "MULTIFUNCTIONAL CONTROL UNIT CU-2140" available from HORIBA STEC, Co. Ltd. were used, respectively.

Thereafter, the electric furnace 3 was heated at a temperature increase rate of 10° C./min. to each of set temperatures (varying from 200° C. to 700° C. at an interval of 50° C. or 100° C.). Once each of the set temperatures was achieved, the temperature was maintained for 10 minutes, and thereafter the gas which had passed through the Tammann tube 4 and had been introduced into a container 6 was taken out using a syringe 7. Part of the gas which was not taken out was passed through water 8 and then discharged to an outside.

The gas that was taken out using the syringe 7 was injected into a gas chromatography (GC) apparatus to be subjected to gas chromatography under the following conditions, whereby a conversion rate from ammonia to hydrogen (hereinafter, also simply called "conversion rate") at each of the set temperatures was determined.

The conversion rate was calculated from a quantitative value of an amount of hydrogen generated at each of the set temperatures, having a quantitative value of an amount of hydrogen generated when ammonia was fully decomposed as 100%. In other words, the conversion rate was calculated in accordance with the following equation.

Conversion rate [%]=(amount of hydrogen generated at each set temperature/amount of hydrogen generated when ammonia was fully decomposed)=100

It should be noted that with the quartz glass tube 9 being not filled with the sample 5, hydrogen generation was not observed until 700° C.

The results are shown in Table 3 below. In the space for a case where no measurement was made, "-" was placed.

GC apparatus: GC-3200 (available from GL Sciences Inc.)

Carrier gas: He (20 mL/min.)

Detector: thermal conductivity detector (TCD)

Column: Porapak T50/80 (available from GL Sciences Inc.)

Column oven temperature: 120° C.

Injection temperature: 150° C.

TCD detection temperature: 120° C.

TCD current: 120 mA

REFERENCE SIGNS LIST

1: gas cylinder
2: gas flow controller
3: electric furnace
4: Tammann tube
5: sample
6: container
7: syringe
8: water
9: quartz glass tube

The invention claimed is:

1. A composite body consisting of:

halloysite powder including a granule in which halloysite including a halloysite nanotube is aggregated, a transition metal catalyst carried in the halloysite powder, wherein a content of a transition metal element in the transition metal catalyst is not less than 0.5 mol % and not more than 10.0 mol % in terms of oxide based on a total amount of the composite body; and optionally, at least one promoter that is selected from the group consisting of an alkali metal catalyst and an alkaline-earth metal catalyst and that is carried in the halloysite powder.

2. The composite body according to claim 1, wherein the granule includes a first pore derived from a tube hole of the halloysite nanotube, and a second pore different from the first pore.

3. The composite body according to claim 1, wherein the transition metal catalyst includes at least one element selected from the group consisting of iron, ruthenium, cobalt, nickel and silver.

4. The composite body according to claim 1, wherein the composite body consists of the halloysite powder, the transition metal catalyst, and the at least one promoter.

TABLE 3

| | Example | | | | | | | | | | Comparative Example | |
|---|---|---|---|---|---|---|---|---|---|---|---|---|
| | 1 | 2 | 3 | 4 | 5 | 6 | 7 | 8 | 9 | 10 | 1 | 2 |
| Catalyst | Na—Ni | Mg—Ni | K—Ni | Na—Ru | Mg—Ru | K—Ru | Na—Fe | Na—Co | Na—Ag | Ru | — | Na—Ru |
| Carrier | Hs1 | Hs1 | Hs1 | Hs1 | Hs1 | Hs1 | Hs1 | Hs1 | Hs1 | Hs1 | Hs1 | X1 |
| 400° C. | 0 | 0 | 0 | 17 | 0 | 2 | 0 | 0 | 0 | 0 | 0 | 0 |
| 500° C. | 16 | 0 | 0 | 86 | 82 | 80 | 0 | 0 | 0 | 66 | 0 | 17 |
| 600° C. | 68 | 0 | 6 | 100 | 100 | 100 | 8 | 0 | 0 | 100 | 0 | 83 |
| 650° C. | — | 43 | 65 | — | — | — | 78 | 21 | 16 | 100 | 4 | — |
| 700° C. | 95 | 65 | 80 | 100 | 100 | 100 | 98 | 51 | 51 | 100 | 37 | — |

<Summary of Evaluation Results>

As shown in Table 3 above, the composite bodies of Examples 1 to 10 exhibited the higher catalytic activity in ammonia decomposition reaction than that of the composite body (halloysite powder 1 alone) of Comparative Example 1.

Comparing Example 4 and Comparative Example 2 both using the same catalyst, i.e., "Na—Ru," Example 4 using the halloysite powder 1 as the carrier exhibited more excellent catalytic activity than that of Comparative Example 2 using the carrier X1.

Comparing Examples 4 to 6 and 10 all using the same transition metal catalyst (Ru), Examples 4 to 6 using the promoter (Na, Mg or K) exhibited more excellent catalytic activity than that of Example 10 using no promoter.

5. The composite body according to claim 4, wherein the at least one promoter includes at least one element selected from the group consisting of sodium, magnesium, and potassium.

6. The composite body according to claim 4, wherein a content of at least one element included in the at least one promoter and selected from the group consisting of an alkali metal element and an alkaline-earth metal element is not less than 0.1 mol % in terms of oxide based on a total amount of the composite body.

7. The composite body according to claim 2, wherein the composite body consists of the halloysite powder, the transition metal catalyst, and the at least one promoter.

8. The composite body according to claim 3, wherein the composite body consists of the halloysite powder, the transition metal catalyst, and the at least one promoter.

9. The composite body according to claim 7, wherein the at least one promoter includes at least one element selected from the group consisting of sodium, magnesium, and potassium.

10. The composite body according to claim 8, wherein the at least one promoter includes at least one element selected from the group consisting of sodium, magnesium, and potassium.

11. The composite body according to claim 5, wherein a content of at least one element included in the at least one promoter and selected from the group consisting of an alkali metal element and an alkaline-earth metal element is not less than 0.1 mol % in terms of oxide based on a total amount of the composite body.

12. The composite body according to claim 7, wherein a content of at least one element included in the at least one promoter and selected from the group consisting of an alkali metal element and an alkaline-earth metal element is not less than 0.1 mol % in terms of oxide based on a total amount of the composite body.

13. The composite body according to claim 8, wherein a content of at least one element included in the at least one promoter and selected from the group consisting of an alkali metal element and an alkaline-earth metal element is not less than 0.1 mol % in terms of oxide based on a total amount of the composite body.

14. The composite body according to claim 9, wherein a content of at least one element included in the at least one promoter and selected from the group consisting of an alkali metal element and an alkaline-earth metal element is not less than 0.1 mol % in terms of oxide based on a total amount of the composite body.

15. The composite body according to claim 10, wherein a content of at least one element included in the at least one promoter and selected from the group consisting of an alkali metal element and an alkaline-earth metal element is not less than 0.1 mol % in terms of oxide based on a total amount of the composite body.

* * * * *